(12) United States Patent
Li et al.

(10) Patent No.: US 11,656,802 B2
(45) Date of Patent: May 23, 2023

(54) DISTRIBUTED BLOCK STORAGE SERVICE COMMAND PROCESSING METHOD, APPARATUS, DEVICE AND MEDIUM

(71) Applicant: INSPUR ELECTRONIC INFORMATION INDUSTRY CO., LTD., Shandong (CN)

(72) Inventors: Hui Li, Shandong (CN); Zhanhao Bai, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 17/774,351

(22) PCT Filed: Aug. 21, 2020

(86) PCT No.: PCT/CN2020/110412
§ 371 (c)(1),
(2) Date: May 4, 2022

(87) PCT Pub. No.: WO2021/128889
PCT Pub. Date: Jul. 1, 2021

(65) Prior Publication Data
US 2022/0300209 A1  Sep. 22, 2022

(30) Foreign Application Priority Data
Dec. 28, 2019  (CN) .......................... 201911384349.9

(51) Int. Cl.
*G06F 3/06*  (2006.01)

(52) U.S. Cl.
CPC ............ *G06F 3/0659* (2013.01); *G06F 3/067* (2013.01); *G06F 3/0611* (2013.01); *G06F 3/0619* (2013.01); *G06F 3/0634* (2013.01)

(58) Field of Classification Search
CPC .... G06F 3/0659; G06F 3/0611; G06F 3/0619; G06F 3/0634; G06F 3/067
See application file for complete search history.

(56) References Cited

U.S. PATENT DOCUMENTS 7,870,492 B2 * 1/2011 Mukundan ............. G06Q 10/00
715/749
10,102,374 B1 * 10/2018 Cohen ................... G06F 21/554
(Continued)

FOREIGN PATENT DOCUMENTS

CN  106293522 A  1/2017
CN  106527985 A  3/2017
(Continued)

OTHER PUBLICATIONS

"Target Daemon (tgtd)—Inqbus Hosting," hosted at http://inqbus-hosting.de/support/dokumentation/docs/target-daemon-tgtd-tgtadm, 3 pages, archive from Aug. 30, 2016 retrieved from https://web.archive.org/web/20160830031038/http://inqbus-hosting.de/support/dokumentation/docs/target-daemon-tgtd-tgtadm (Year: 2016).*

(Continued)

*Primary Examiner* — Mark A Giardino, Jr.
(74) *Attorney, Agent, or Firm* — Cooper Legal Group, LLC (57) ABSTRACT

Disclosed are a distributed block storage service command processing method, apparatus, a device and a medium. The method includes: by means of tgtadm, acquiring a rbd command of a block storage service, parsing the rbd command to obtain a corresponding task parameter, and then transmitting the task parameter to an ISCSI target (S11); by means of tgtd, starting a dedicated thread for processing a task corresponding to the task parameter, and monitoring a real-time processing result of the current task (S12); and returning the real-time processing result to the tgtadm by means of the ISCSI target, whereby the tgtadm displays the real-time processing result on a human-computer interface (S13).

16 Claims, 3 Drawing Sheets

(56) References Cited

U.S. PATENT DOCUMENTS

| | | | | |
|---|---|---|---|---|
| 2012/0254893 | A1* | 10/2012 | Pope | G06F 9/48 |
| | | | | 719/318 |
| 2019/0171264 | A1 | 6/2019 | Lakshman et al. | |
| 2019/0354386 | A1 | 11/2019 | Cahana et al. | |
| 2022/0138027 | A1* | 5/2022 | Graf | G06F 9/544 |
| | | | | 711/118 |
| 2022/0188028 | A1* | 6/2022 | Mesnier | G06F 3/067 |

FOREIGN PATENT DOCUMENTS

| | | |
|---|---|---|
| CN | 108196788 A | 6/2018 |
| CN | 109324927 A | 2/2019 |
| CN | 109992433 A | 7/2019 |
| CN | 111176577 A | 5/2020 |

OTHER PUBLICATIONS

International Search Report and English Translation cited in PCT/CN2020/110412, dated Nov. 26, 2020, 6 pages.

Written Opinion and English Translation cited in PCT/CN2020/110412, dated Nov. 26, 2020, 9 pages dated Nov. 26, 2020.

Jessica Programmer, "iscsi target tgt architecture", «https://www.cnblogs.eom/wuchanming/p/4894373.html», Oct. 20, 2015, pp. 1-6, Section 1.2.

Wang, Yan, et al. "Dynamic vol. reconfiguration strategy of multi host system in network computing mode". «China Master's Theses Full-text Database Information Technology» No. 01, Jan. 15, 2019 I139-8, p. 18 Section 2.3.3.

Corresponding Chinese Patent Application No. 201911384349.9, First Office Action, dated Mar. 15, 2021.

\* cited by examiner

DISTRIBUTED BLOCK STORAGE SERVICE COMMAND PROCESSING METHOD, APPARATUS, DEVICE AND MEDIUM

This application claims priority to Chinese Patent Application No. 201911384349.9, filed on Dec. 28, 2019 in China National Intellectual Property Administration and entitled "Distributed Block Storage Service Command Processing Method, Apparatus, Device and Medium", which is hereby incorporated by reference in its entirety.

FIELD

The present application relates to the technical field of computers, in particular to a distributed block storage service command processing method, apparatus, device and medium.

BACKGROUND

RBD block storage is the most widely used and stable storage type among three storage types provided by Ceph. A RBD block is similar to a disk and can be mounted into physical or virtual machines. In the ISCSI (Internet Small Computer System Interface), mainly through a technology of TCP/IP (Transmission Control Protocol/Internet protocol), a storage device (RBD) is made, via an ISCSI target function, into a server side capable of providing a disk, and is then made, via an ISCSI initiator function, into a client capable of mounting and using an ISCSI target. In this way, application of disks can be achieved via an ISCSI protocol. In other words, the ISCSI architecture mainly divides the storage device and a host used into two parts, including:

1. ISCSI target: It is a storage device side, namely a device that stores a disk or RAID (Redundant Array of Independent Disks). At present, a Linux host can also be simulated as an ISCSI target, to provide a disk for use by other hosts.

2. ISCSI initiator: It is a client that can use the target, usually a server. That is to say, a server that intends to be connected to the ISCSI target needs to have the relevant functions of the ISCSI initiator installed before using the disk provided by the ISCSI target.

In practical applications, a client terminal can achieve operation on the block storage by establishing librbd (that is, a block storage library provided by Ceph, which achieves a RBD interface) which is connected to and accesses a bottom layer with tgt (that is, a Linux SCSI target framework, an ISCSI target implemented by a user state). A plurality of block devices can be mapped to one target, and a plurality of targets can be established on one tgt. The client terminal can be connected to one or more targets on the tgt for access. The tgt can establish a LUN (Logical Unit Number) to provide block services to the client, and one LUN corresponds to one block storage volume.

In the prior art, the RBD can manage volumes, snapshots, clones, etc. through command lines, but if a volume is being mounted and used by the ISCSI target, that is, if the volume has been opened, and at this time, if the volume and the snapshot are being modified through a rbd command line, an ISCSI target service will not be able to use simultaneous snapshot rollback. Currently, the Ceph does not support online rollback. If snapshot rollback is required, mapping volumes need to be unloaded layer by layer, then rolled back, and finally re-mapped and mounted. Such a process is quite cumbersome. At the same time, if rbd is one progress, and the command is called very frequently, a large number of progresses will be started, whereby a large number of unrelated services will appear in a cluster and affect the overall performance. In a distributed deployment scenario with an extremely high performance requirement, it will inevitably affect the user experience.

SUMMARY

In view of this, the present application aims to provide a distributed storage block command processing method, apparatus, device and medium, which can simplify a command processing flow and reduce a cluster load, thus improving the overall performance of a cluster. The specific solution is as follows:

In a first aspect, the present application discloses a distributed block storage service command processing method based on an ISCSI, including:

by means of tgtadm (a management tool of tgt, that is, a Linux SCSI target framework management tool), acquiring a rbd command of a block storage service, parsing the rbd command to obtain a corresponding task parameter, and then transmitting the task parameter to an ISCSI target;

by means of tgtd (daemon of the tgt, that is, a Linux SCSI target framework daemon progress), starting a dedicated thread for processing a task corresponding to the task parameter, and monitoring a real-time processing result of the current task; and returning the real-time processing result to the tgtadm by means of the ISCSI target, whereby the tgtadm displays the real-time processing result on a human-computer interface.

Optionally, the transmitting the task parameter to an ISCSI target by means of tgtadm includes:

transmitting the task parameter to the ISCSI target by means of tgtadm and on the basis of an IPC (Inter-Process Communication) manner.

Correspondingly, the returning the real-time processing result to the tgtadm by means of the ISCSI target includes:

returning the real-time processing result to the tgtadm by means of the ISCSI target and on the basis of the IPC manner.

Optionally, during starting, by means of tgtd, a dedicated thread for processing a task corresponding to the task parameter, the method further includes:

deleting a file descriptor (fd) from epoll monitoring.

Optionally, the process of monitoring a real-time processing result of the current task by means of tgtd includes:

setting, by means of the tgtd, a callback function, and acquiring, by means of the callback function, a real-time processing result of the current task.

Optionally, the setting, by means of the tgtd, a callback function, and acquiring, by means of the callback function, a real-time processing result of the current task includes:

by means of the tgtd, setting a callback function, and transmitting the callback function and the task parameter to the block storage service, whereby the block storage service calls the callback function to return a corresponding real-time processing progress to the tgtd when a target progress state corresponding to the task parameter has an update.

Optionally, the returning the real-time processing result to the tgtadm by means of the ISCSI target, whereby the tgtadm displays the real-time processing result on a human-computer interface includes:

by means of the ISCSI target, parsing the real-time processing progress, calculating a corresponding progress percentage, and then returning the progress percentage to the tgtadm, whereby the tgtadm converts the process percentage into a corresponding progress bar, and displays the progress bar on a human-computer interface.

Optionally, the acquiring, by means of the callback function, the real-time processing result of the current task further includes:

acquiring an error code of the current task by means of the callback function.

In a second aspect, the present application discloses a distributed block storage service command processing apparatus based on an ISCSI, including:

a command acquiring module configured for acquiring, by means of tgtadm, a rbd command of a block storage service;

a command parsing module configured for parsing, by means of the tgtadm, the rbd command to obtain a corresponding task parameter, and then transmitting the task parameter to an ISCSI target;

a thread starting module configured for starting, by means of tgtd, a dedicated thread for processing a task corresponding to the task parameter;

a result monitoring module configured for monitoring, by means of the tgtd, a real-time processing result of the current task; and a result returning module configured for returning, by means of the ISCSI target, the real-time processing result to the tgtadm, whereby the tgtadm displays the real-time processing result on a human-computer interface.

In a third aspect, the present application discloses an electronic device, including:

a memory configured for storing a computer program; and a processor configured for executing the computer program to implement the before-mentioned distributed block storage service command processing method based on the ISCSI.

In a fourth aspect, the present application discloses a computer-readable storage medium configured for storing a computer program to implement the afore-mentioned distributed block storage service command processing method based on the ISCSI.

In the present application, the rbd command of the block storage service is acquired by means of the tgtadm, and the corresponding task parameter is moved upwards to the ISCSI target; by means of the tgtd, the dedicated thread for processing the task corresponding to the task parameter is started, and the real-time processing result is monitored; and the real-time processing result is then returned to the tgtadm by means of the ISCSI target, whereby the tgtadm displays the real-time processing result on the human-computer interface. Therefore, in the present application, the rbd command is moved upwards to a target layer, which is equivalent to moving operations for volumes, snapshots, and clones upwards to the target layer for processing. In this case, if it is necessary to carry out operations such as volume modification and snapshot rollback, related scheduling can be directly completed on the target layer without an operation of unmounting and mounting again. This process is insensitive to users. In this way, a large amount of human labor can be saved, the flow is simplified, and the user experience is improved. Moreover, after a large number of query commands are moved upwards to the target layer, many processes and io flows irrelevant to businesses are reduced in a distributed cluster, thus greatly reducing the cluster load.

BRIEF DESCRIPTION OF THE DRAWINGS

In order to describe the embodiments of the present invention or the technical solutions in the existing art more clearly, drawings required to be used in the embodiments or the illustration of the existing art will be briefly introduced below. Apparently, the drawings in the illustration below are only some embodiments of the present application. Those ordinarily skilled in the art also can obtain other drawings according to the provided drawings without creative work.

DETAILED DESCRIPTION

The technical solutions in the embodiments of the present application will be clearly and completely described below with reference to the accompanying drawings in the embodiments of the present application. Obviously, the described embodiments are only a part of the embodiments of the present application, rather than all the embodiments. Based on the embodiments of the present application, all other embodiments obtained by those skilled in the art without creative work shall fall within the protection scope of the present application.

In the prior art, the RBD can manage volumes, snapshots, clones, etc. through command lines, but if a volume is being mounted and used by the ISCSI target, that is, if the volume has been opened, and at this time, if the volume and the snapshot are being modified through a rbd command line, an ISCSI target service will not be able to use simultaneous snapshot rollback. Currently, the Ceph does not support online rollback. If snapshot rollback is required, mapping volumes need to be unloaded layer by layer, then rolled back, and finally re-mapped and mounted. Such a process is quite cumbersome. At the same time, if rbd is one progress, and the command is called very frequently, a large number of progresses will be started, whereby a large number of unrelated services will appear in a cluster and affect the overall performance. In a distributed deployment scenario with an extremely high performance requirement, it will inevitably affect the user experience. In view of this, the present application provides a distributed storage block command processing solution, which can simplify a command processing flow and reduce a cluster load, thus improving the overall performance of a cluster.

Figure 1:
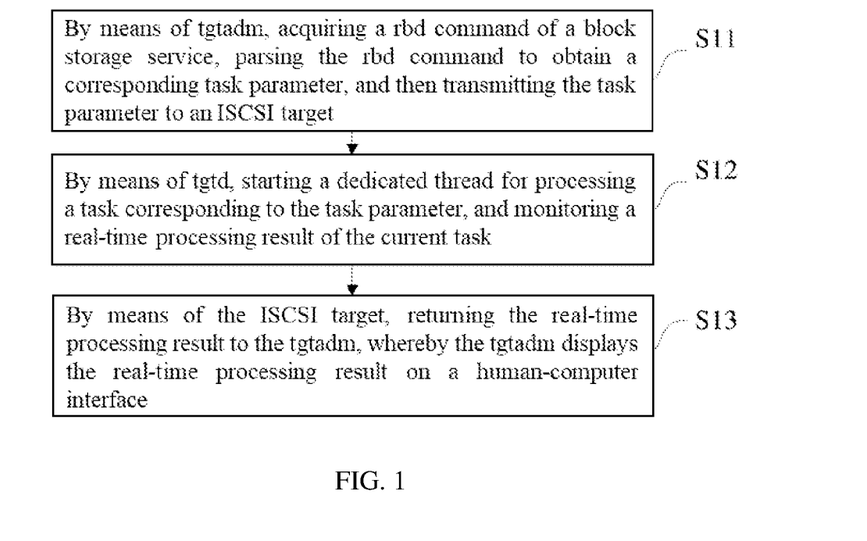
FIG. 1 is a flow chart of a distributed block storage service command processing method based on an ISCSI disclosed by the present application.

Referring to FIG. 1, an embodiment of the present application discloses a distributed block storage service command processing method based on an ISCSI, including the following steps:

Step S11: by means of tgtadm, acquiring a rbd command of a block storage service, parsing the rbd command to obtain a corresponding task parameter, and then transmitting the task parameter to an ISCSI target.

In this embodiment, the tgtadm is a management tool, and the objects it manages include a target.

It should be noted that the rbd command in this embodiment includes, but not limited to, relevant operation commands for volumes, snapshots, and clones.

In this embodiment, the tgtadm and the ISCSI target may communicate with each other on the basis of an IPC manner.

That is, the task parameter is transmitted to the ISCSI target by means of tgtadm, specifically including: the task parameter is transmitted to the ISCSI target by means of tgtadm and on the basis of the IPC manner.

Step S12: by means of tgtd, starting a dedicated thread for processing a task corresponding to the task parameter, and monitoring a real-time processing result of the current task.

In this embodiment, in order to reduce the influence of the block storage service on other businesses, the dedicated thread is started by means of the tgtd, which is specifically used for processing the task corresponding to the above task parameter.

Further, in order to prevent the task from being triggered by mistake subsequently when the real-time processing result such as progress information is sent, in this embodiment, the starting the dedicated thread for processing the task corresponding to the task parameter by means of tgtd may further includes: deleting an fd from epoll monitoring.

In addition, in order to achieve monitoring for the real-time processing result of the current task, this embodiment may be implemented with the callback function. That is, in this embodiment, the process of monitoring a real-time processing result of the current task by means of tgtd may specifically include: setting, by means of the tgtd, a callback function, and acquiring, by means of the callback function, a real-time processing result of the current task.

In this embodiment, the acquiring, by means of the callback function, the real-time processing result of the current task may specifically include: acquiring, by means of the callback function, a real-time processing progress of the current task. Further, the acquiring, by means of the callback function, the real-time processing result of the current task may further include: acquiring, by means of the callback function, an error code of the current task. That is, the real-time processing result in this embodiment may specifically include the real-time processing progress or the error code of the current task.

Step S13: returning the real-time processing result to the tgtadm by means of the ISCSI target, whereby the tgtadm displays the real-time processing result on a human-computer interface.

Specifically, the returning the real-time processing result to the tgtadm by means of the ISCSI target may include includes: returning the real-time processing result to the tgtadm by means of the iscis target and on the basis of the IPC manner.

In the embodiments of present application, the rbd command of the block storage service is acquired by means of the tgtadm, and the corresponding task parameter is moved upwards to the ISCSI target; by means of the tgtd, the dedicated thread for processing the task corresponding to the task parameter is started, and the real-time processing result is monitored; and the real-time processing result is then returned to the tgtadm by means of the ISCSI target, whereby the tgtadm displays the real-time processing result on the human-computer interface. Therefore, in the embodiments of the present application, the rbd command is moved upwards to a target layer, which is equivalent to moving operations for volumes, snapshots, and clones upwards to the target layer for processing. In this case, if it is necessary to carry out operations such as volume modification and snapshot rollback, related scheduling can be directly completed on the target layer without an operation of unmounting and mounting again. This process is insensitive to users. In this way, a large amount of human labor can be saved, the flow is simplified, and the user experience is improved. Moreover, after a large number of query commands are moved upwards to the target layer, many processes and io flows irrelevant to businesses are reduced in a distributed cluster, thus greatly reducing the cluster load.

Figure 2:
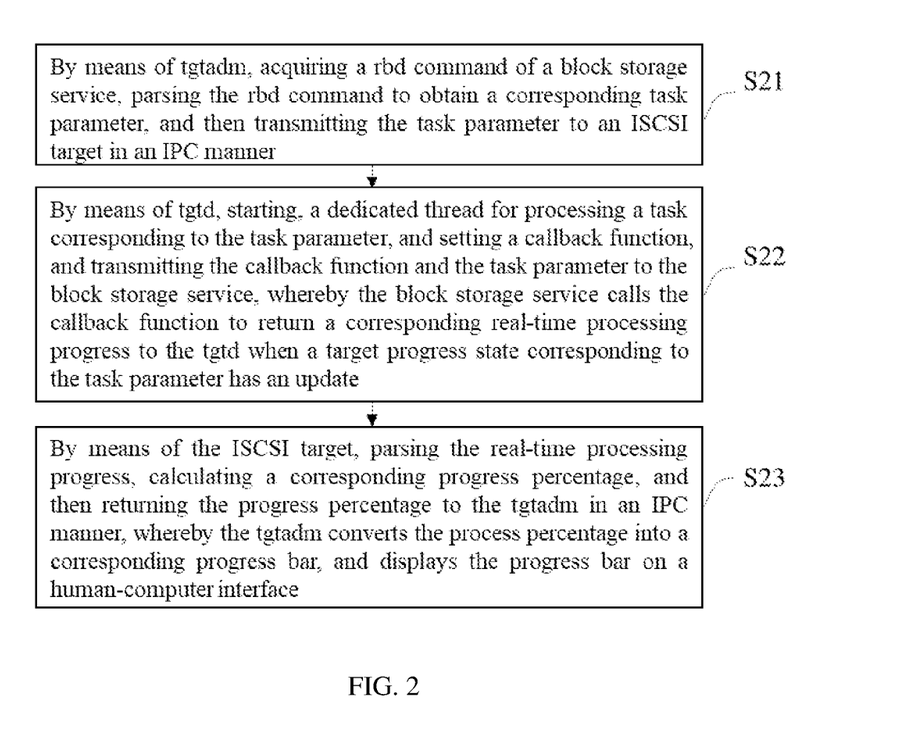
FIG. 2 is a flow chart of a specific distributed block storage service command processing method based on an ISCSI disclosed by the present application.

Referring to FIG. 2, an embodiment of the present application discloses a particular distributed block storage service command processing method based on an ISCSI, including the following steps:

Step S21: by means of tgtadm, acquiring a rbd command of a block storage service, parsing the rbd command to obtain a corresponding task parameter, and then transmitting the task parameter to an ISCSI target in an IPC manner.

Step S22: starting, by means of tgtd, a dedicated thread for processing a task corresponding to the task parameter, and setting a callback function, and transmitting the callback function and the task parameter to the block storage service, whereby the block storage service calls the callback function to return a corresponding real-time processing progress to the tgtd when a target progress state corresponding to the task parameter has an update.

In this embodiment, after the ISCSI target receives the task parameter, the tgtd will start the corresponding dedicated task processing thread, set the callback function, and then transmit the callback function and the task parameter to the block storage service. In this way, when the target progress state corresponding to the task parameter has an update, the block storage service may directly actively call the above callback function, so as to return the corresponding real-time processing progress to the tgtd and achieve the purpose of the tgtd for monitoring the real-time processing result of the current task.

Step S23: by means of the ISCSI target, parsing the real-time processing progress, calculating a corresponding progress percentage, and then returning the progress percentage to the tgtadm in an IPC manner, whereby the tgtadm converts the process percentage into a corresponding progress bar, and displays the progress bar on a human-computer interface.

In this embodiment, the iscis target will calculate the progress percentage corresponding to the above real-time processing progress, and send the progress percentage to the tgtadm in the IPC manner. After acquiring the above progress percentage, the tgtadm may convert the same into the corresponding visual progress bar, and send the progress bar to the human-computer interface for display. In this way, a user can visually and timely know the processing process of the current task.

Figure 3:
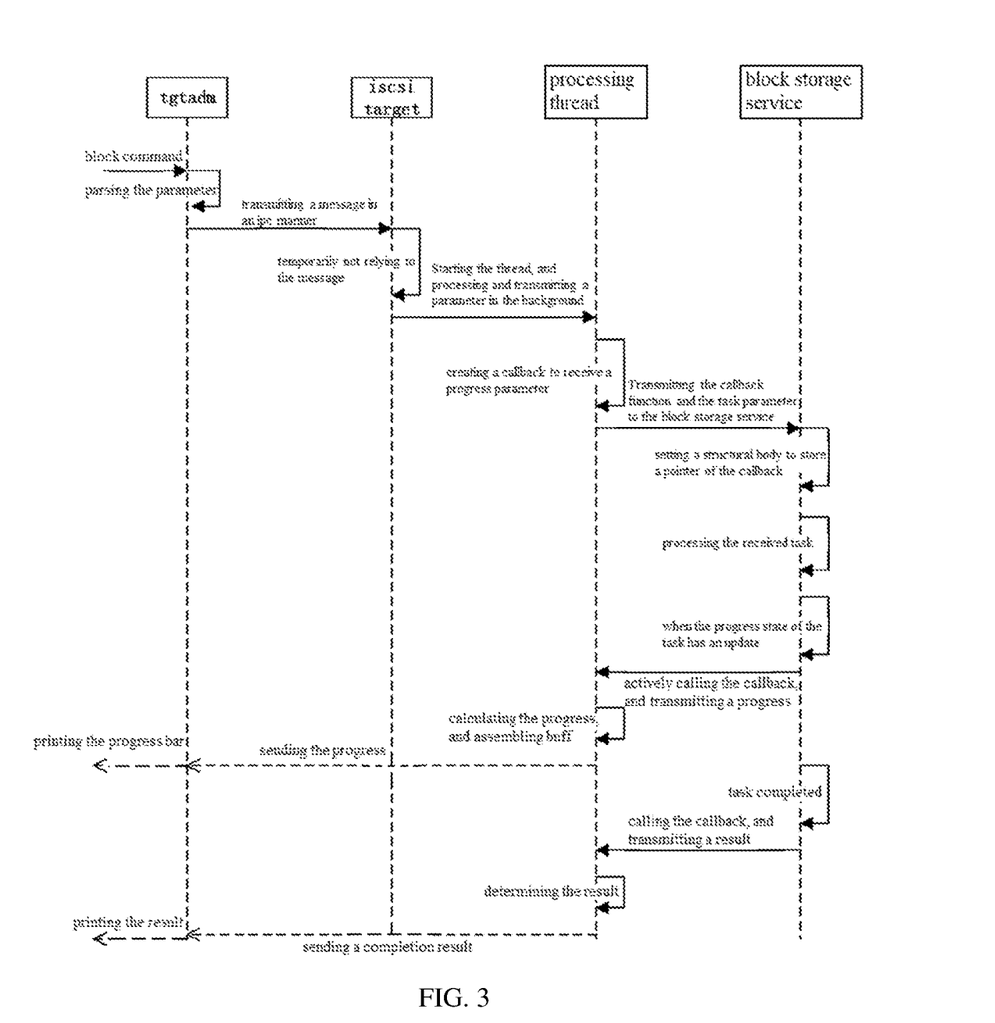
FIG. 3 is a flow chart of a specific distributed block storage service command processing method based on an ISCSI disclosed by the present application.

FIG. 3 illustrates a flow of a specific distributed block storage service command processing method based on an ISCSI disclosed by the present application. In FIG. 3, a command line parameter of the block storage service is transferred to an ISCSI target layer for redesign, and is transmitted to the tgtd in the IPC manner. In order to reduce the influence of the interaction of the block storage service on other businesses, the tgtd starts a thread to independently process this type of task, and deletes the fd from the epoll monitoring to prevent mistake triggering of the task at each transmission of the progress. A need_process sign is designed to indicate whether it is necessary to print a progress bar, and this sign is set to be true only for a command line that needs a progress bar; progress_count is designed at the tgtadm to mark the number of replies. At each time when the tgtd replies, progress_count++ is executed. At the first receiving by the tgtadm, it is determined that progress is 1, that is, a label is added on the progress during printing to indicate a command; designing progress marks the current progress percentage; designing complete marks whether it is completed; and the tgtadm controls the percentage process in each update. When progress_count is not 1, and progress is not 0, the following code is executed:

printf (stdout, "%.s", 4, backspace), completing a command line, and displaying backspace. When the complete sign is not true, the following code is executed:

fprintf (stdout, "%*u % %", 3, progress), completing the printing of the progress bar.

In FIG. 3, at the ISCSI target, by means of the tgtd, the callback function is designed, and a pointer of the function is transmitted to the block storage service. This function is called when there is a progress update during the task processing by the block storage service. The ISCSI target will parse the progress, calculate the percentage, and send, through an IPC socket, a message to the tgtadm, and the tgatdm then displays a task progress on an interface of a console.

It can be seen that in this embodiment, each rbd command is moved upwards to the target layer, and various processing logics are managed in the ISCSI target layer. Various operations can be performed on volumes without canceling volume mapping. The tgtd sets the callback responsible for receiving the progress of the block storage service and sending the same to the tgtadm, and the progress will be shown to the user through an algorithm. The ISCSI commands error code information to be returned. That is, in this embodiment, the rbd command is moved upwards to the ISCSI target layer; the target layer receives an upper-layer task and acts as an intermediate layer between the rbd and the user; the ISCSI target indirectly designs the callback to acquire the processing progress or error code of the block storage service, and transmits the same to the tgtadm by the IPC; the tgtadm shows the progress to the user through the algorithm, and displays the error code. Through the above solution, the operations such as volume renaming and volume deletion can be performed without canceling the volume mapping.

Figure 4:
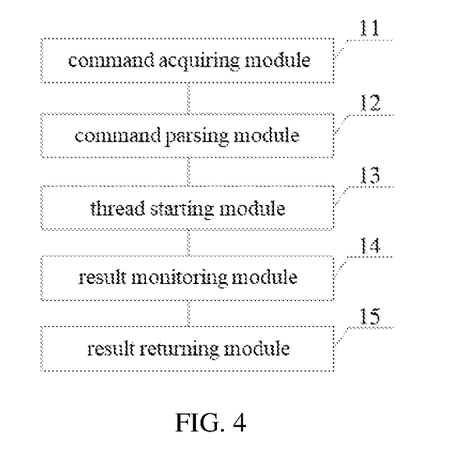
FIG. 4 is a schematic structural diagram of a distributed block storage service command processing apparatus based on an ISCSI disclosed by the present application.

Referring to FIG. 4, an embodiment of the present application further correspondingly discloses a distributed block storage service command processing apparatus based on an ISCSI, including:

a command acquiring module 11 configured for acquiring, by means of tgtadm, a rbd command of a block storage service;

a command parsing module 12 configured for parsing, by means of the tgtadm, the rbd command to obtain a corresponding task parameter, and then transmitting the task parameter to an ISCSI target;

a thread starting module 13 configured for starting, by means of tgtd, a dedicated thread for processing a task corresponding to the task parameter;

a result monitoring module 14 configured for monitoring, by means of the tgtd, a real-time processing result of the current task; and a result returning module 15 configured for returning, by means of the ISCSI target, the real-time processing result to the tgtadm, whereby the tgtadm displays the real-time processing result on a human-computer interface.

In the embodiments of present application, the rbd command of the block storage service is acquired by means of the tgtadm, and the corresponding task parameter is moved upwards to the ISCSI target; by means of the tgtd, the dedicated thread for processing the task corresponding to the task parameter is started, and the real-time processing result is monitored; and the real-time processing result is then returned to the tgtadm by means of the ISCSI target, whereby the tgtadm displays the real-time processing result on the human-computer interface. Therefore, in the embodiments of the present application, the rbd command is moved upwards to a target layer, which is equivalent to moving operations for volumes, snapshots, and clones upwards to the target layer for processing. In this case, if it is necessary to carry out operations such as volume modification and snapshot rollback, related scheduling can be directly completed on the target layer without an operation of unmounting and mounting again. This process is insensitive to users. In this way, a large amount of human labor can be saved, the flow is simplified, and the user experience is improved. Moreover, after a large number of query commands are moved upwards to the target layer, many processes and io flows irrelevant to businesses are reduced in a distributed cluster, thus greatly reducing the cluster load.

In one specific embodiment, the command parsing module 12 includes:

a command parsing unit configured for parsing, by means of the tgtadm, the rbd command to obtain a corresponding task parameter;

a parameter transmission unit configured for transmitting the task parameter to the ISCSI target by means of tgtadm and on the basis of an IPC manner.

In one specific embodiment, the result returning module 15 is specifically configured for returning, by means of the ISCSI target, the real-time processing result to the tgtadm in an IPC manner, whereby the tgtadm displays the real-time processing result on a human-computer interface.

In one specific embodiment, the thread starting module 13 further includes: a descriptor deleting unit configured for, during the starting, by means of tgtd, a dedicated thread for processing a task corresponding to the task parameter, deleting an fd from epoll monitoring.

In one specific embodiment, the result monitoring module 14 includes:

a callback setting sub-module configured for setting, by means of the tgtd, a callback function, and acquiring, by means of the callback function, a real-time processing result of the current task.

In one specific embodiment, the callback setting sub-module includes:

a callback setting unit configured for setting, by means of the tgtd, a callback function;

an information transmission unit configured for transmitting the callback function and the task parameter to the block storage service, whereby the block storage service calls the callback function to return a corresponding real-time processing progress to the tgtd when a target progress state corresponding to the task parameter has an update.

In one specific embodiment, the result returning module 15 is specifically configured for, by means of the ISCSI target, parsing the real-time processing progress, calculating a corresponding progress percentage, and then returning the progress percentage to the tgtadm, whereby the tgtadm converts the progress percentage into a corresponding progress bar, and displays the progress bar on a human-computer interface.

In one specific embodiment, the callback setting sub-module further includes:

an error code acquisition unit configured for acquiring an error code of the current task by means of the callback function.

Figure 5:
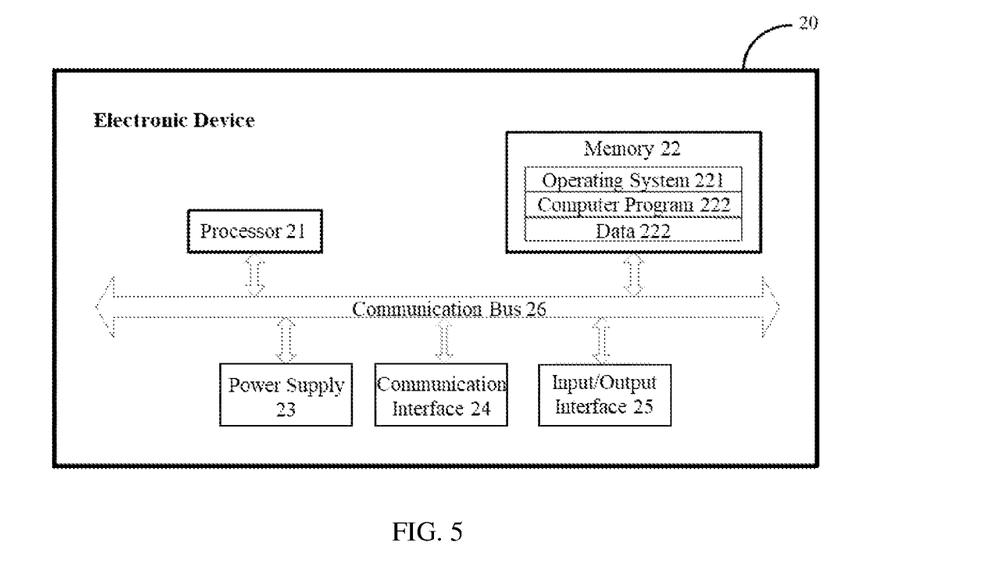
FIG. 5 is a structural diagram of an electronic device disclosed by the present application.

Further, an embodiment of the present application further provides an electronic device. FIG. 5 is a structural diagram of an electronic device 20 illustrated according to an exemplary embodiment. The content in the figure cannot be deemed as any limitation to the application range of the present application.

FIG. 5 is a schematic structural diagram of an electronic device 20 provided in an embodiment of the present application. The electronic device 20 may specifically include: at least one processor 21, at least one memory 22, a power supply 23, a communication interface 24, an input/output interface 25, and a communication bus 26. The memory 22 is configured for storing a computer program, and the computer program is loaded and executed by the processor 21 to implement the relevant steps in the distributed block storage service command processing method disclosed in any of the foregoing embodiments.

In this embodiment, the power supply 23 is configured for providing a working voltage for each hardware device on the electronic device 20. The communication interface 24 can establish a data transmission channel between the electronic device 20 and an external device, and a communication protocol that it follows is applicable to any communication protocol in the technical solution of the present application, which is not specifically limited here. The input/output interface 25 is configured for acquiring data input from or output to the outside, and its specific interface type can be selected according to specific application needs, which is not specifically limited here.

In addition, the memory 22, as a carrier for resource storage, can be a read-only memory, a random access memory, a magnetic disk or an optical disk, etc. Resources stored thereon include an operating system 221, a computer program 222, data 223, etc., and the storage method can be temporary storage or permanent storage.

The operating system 221 is configured for managing and controlling each hardware device and computer program 222 on the electronic device 20, so as to achieve operations and processing for massive data 223 in the memory 22 by the processor 21, which can be Windows Server, Netware, Unix, Linux, etc. In addition to including the computer program for completing the distributed storage service command processing method implemented by the electronic device 20 disclosed in any one of the foregoing embodiments, the computer program 222 may further include computer programs for completing other specific operations. The data 223 may include various data collected by the electronic device 20.

Further, an embodiment of the present application discloses a computer-readable storage medium configured for storing a computer program to implement the distributed block storage service command processing method based on the ISCSI disclosed in the foregoing embodiment.

All the embodiments in this specification are described in a progressive manner. Contents mainly described in each embodiment are different from those described in other embodiments. Same or similar parts of all the embodiments refer to each other. For the device disclosed in the embodiments, since it corresponds to the method disclosed in the embodiments, the description is relatively simple, and the relevant part can be referred to the description of the method part.

The steps of a method or algorithm described in conjunction with the embodiments disclosed herein may be directly implemented in hardware, a software module executed by a processor, or a combination of the hardware and the software module. The software module can be placed in a random access memory (RAM), an internal memory, a read only memory (ROM), an electrically programmable ROM, an electrically erasable programmable ROM, a register, a hard disk, a mobile disk, a CD-ROM, or any storage medium in other forms known to the technical field.

The above describes the distributed block storage service command processing method and apparatus, a device, and a medium in detail provided by the present application. Specific examples are used herein to illustrate the principle and implementation modes of the present application. The descriptions of the above embodiments are only used to help understand the method and its key thoughts of the present application. Moreover, for those of ordinary skill in the art, according to the ideas of the present application, there will be changes in the specific implementation modes and the scope of application. In summary, the content of this specification should not be construed as limiting the present application.

What is claimed is:

1. A distributed block storage service command processing method, comprising:
    by means of tgtadm, acquiring a rbd command of a block storage service, parsing the rbd command to obtain a corresponding task parameter, and then transmitting the task parameter to an Internet Small Computer System Interface (ISCSI) target;
    by means of tgtd, starting a dedicated thread for processing a task corresponding to the task parameter, and monitoring a real-time processing result of the task; and
    by means of the ISCSI target, returning the real-time processing result to the tgtadm, whereby the tgtadm displays the real-time processing result on a human-computer interface;
    wherein the monitoring a real-time processing result of the task by means of tgtd comprises:
        by means of the tgtd, setting a callback function, and transmitting the callback function and the task parameter to the block storage service, whereby the block storage service calls the callback function to return a corresponding real-time processing progress to the tgtd when a target progress state corresponding to the task parameter has an update.

2. The distributed block storage service command processing method according to claim 1, wherein the transmitting the task parameter to an ISCSI target by means of tgtadm comprises:
    transmitting the task parameter to the ISCSI target by means of the tgtadm and on the basis of an Inter-Process Communication (IPC) manner.

3. The distributed block storage service command processing method according to claim 1, wherein at the same time as the starting, by means of tgtd, a dedicated thread for processing a task corresponding to the task parameter, the method further comprises:
    deleting a file descriptor (fd) from epoll monitoring.

4. The distributed block storage service command processing method according to claim 1, wherein the returning the real-time processing result to the tgtadm by means of the ISCSI target, whereby the tgtadm displays the real-time processing result on a human-computer interface comprises:
    by means of the ISCSI target, parsing the corresponding real-time processing progress, calculating a corresponding progress percentage, and then returning the corresponding progress percentage to the tgtadm, whereby the tgtadm converts the corresponding progress percentage into a corresponding progress bar, and displays the corresponding progress bar on the human-computer interface.

5. The distributed block storage service command processing method according to claim 1, wherein the monitoring a real-time processing result of the task by means of tgtd further comprises:
acquiring an error code of the task by means of the callback function.

6. The distributed block storage service command processing method based on the ISCSI according to claim 1, wherein the returning the real-time processing result to the tgtadm by means of the ISCSI target comprises:
returning the real-time processing result to the tgtadm by means of the ISCSI target and on the basis of an Inter-Process Communication (IPC) manner.

7. An electronic device, comprising:
a memory configured for storing a computer program; and
a processor configured for executing the computer program to implement a distributed block storage service command processing method, comprising:
by means of tgtadm, acquiring a rbd command of a block storage service, parsing the rbd command to obtain a corresponding task parameter, and then transmitting the task parameter to an Internet Small Computer System Interface (ISCSI) target;
by means of tgtd, starting a dedicated thread for processing a task corresponding to the task parameter, and monitoring a real-time processing result of the task; and
returning the real-time processing result to the tgtadm by means of the ISCSI target, whereby the tgtadm displays the real-time processing result on a human-computer interface;
wherein the monitoring a real-time processing result of the task by means of tgtd comprises:
by means of the tgtd, setting a callback function, and transmitting the callback function and the task parameter to the block storage service, whereby the block storage service calls the callback function to return a corresponding real-time processing progress to the tgtd when a target progress state corresponding to the task parameter has an update.

8. The electronic device according to claim 7, wherein the transmitting the task parameter to an ISCSI target by means of tgtadm comprises:
transmitting the task parameter to the ISCSI target by means of the tgtadm and on the basis of an Inter-Process Communication (IPC) manner.

9. The electronic device according to claim 7, wherein the returning the real-time processing result to the tgtadm by means of the ISCSI target comprises:
returning the real-time processing result to the tgtadm by means of the ISCSI target and on the basis of an Inter-Process Communication (IPC) manner.

10. The electronic device according to claim 7, wherein at the same time as the starting, by means of tgtd, a dedicated thread for processing a task corresponding to the task parameter, the method further comprises:
deleting a file descriptor (fd) from epoll monitoring.

11. The electronic device according to claim 7, wherein the returning the real-time processing result to the tgtadm by means of the ISCSI target, whereby the tgtadm displays the real-time processing result on a human-computer interface comprises:
by means of the ISCSI target, parsing the corresponding real-time processing progress, calculating a corresponding progress percentage, and then returning the corresponding progress percentage to the tgtadm, whereby the tgtadm converts the corresponding progress percentage into a corresponding progress bar, and displays the corresponding progress bar on the human-computer interface.

12. The electronic device according to claim 7, wherein the monitoring a real-time processing result of the task by means of tgtd further comprises:
acquiring an error code of the task by means of the callback function.

13. A non-transitory computer-readable storage medium, being configured for storing a computer program to implement a distributed block storage service command processing method, comprising:
by means of tgtadm, acquiring a rbd command of a block storage service, parsing the rbd command to obtain a corresponding task parameter, and then transmitting the task parameter to an Internet Small Computer System Interface (ISCSI) target;
by means of tgtd, starting a dedicated thread for processing a task corresponding to the task parameter, and monitoring a real-time processing result of the task; and
returning the real-time processing result to the tgtadm by means of the ISCSI target, whereby the tgtadm displays the real-time processing result on a human-computer interface;
wherein the monitoring a real-time processing result of the task by means of tgtd comprises:
by means of the tgtd, setting a callback function, and transmitting the callback function and the task parameter to the block storage service, whereby the block storage service calls the callback function to return a corresponding real-time processing progress to the tgtd when a target progress state corresponding to the task parameter has an update.

14. The non-transitory computer-readable storage medium according to claim 13, wherein the transmitting the task parameter to an ISCSI target by means of tgtadm comprises:
transmitting the task parameter to the ISCSI target by means of the tgtadm and on the basis of an Inter-Process Communication (IPC) manner.

15. The non-transitory computer-readable storage medium according to claim 13, wherein the returning the real-time processing result to the tgtadm by means of the ISCSI target comprises:
returning the real-time processing result to the tgtadm by means of the ISCSI target and on the basis of an IPC (Inter-Process Communication) manner.

16. The non-transitory computer-readable storage medium according to claim 15, wherein at the same time as the starting, by means of tgtd, a dedicated thread for processing a task corresponding to the task parameter, the method further comprises:
deleting a file descriptor (fd) from epoll monitoring.

* * * * *